UNITED STATES PATENT OFFICE.

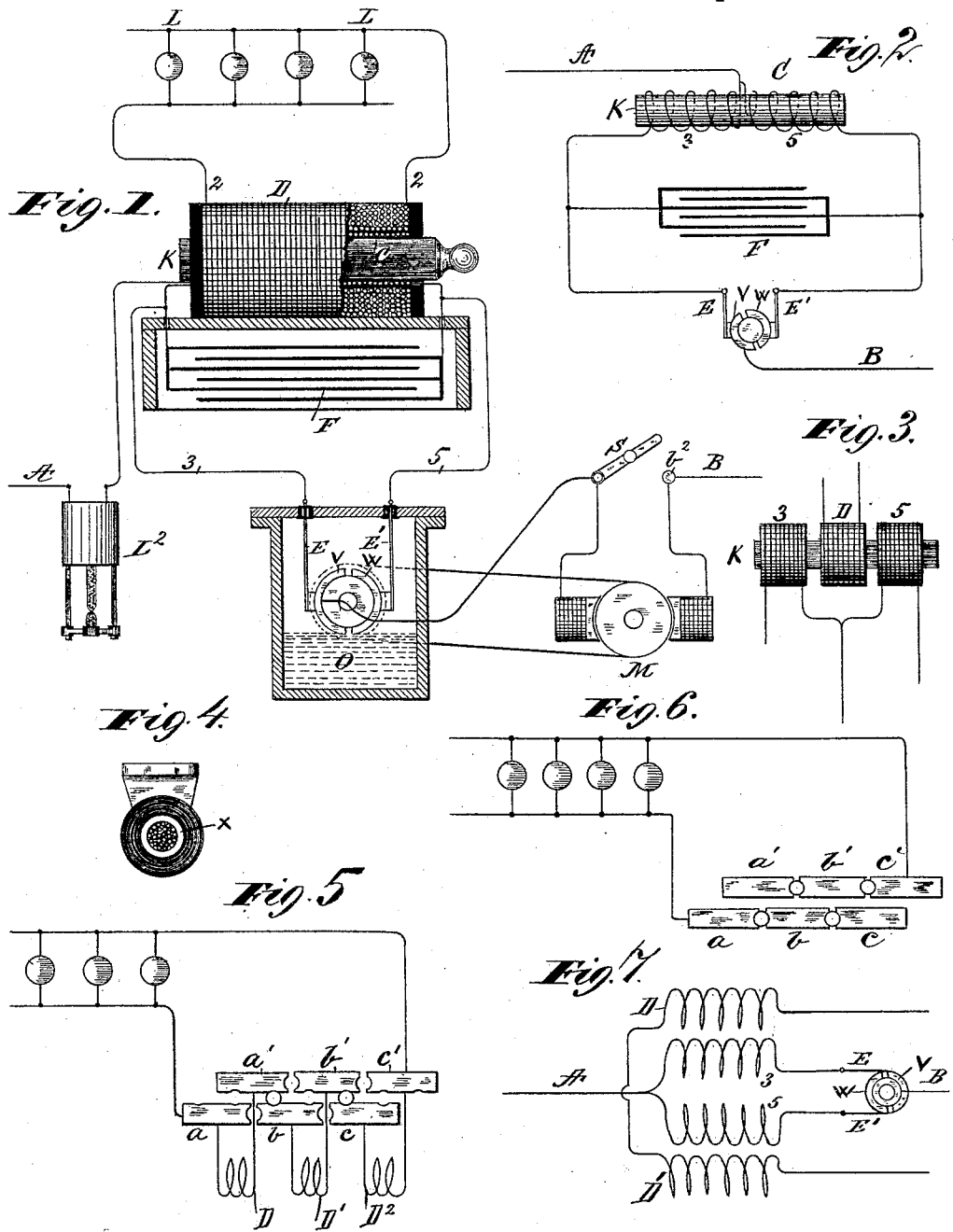

ELIHU THOMSON, OF LYNN, MASSACHUSETTS, ASSIGNOR TO THE THOMSON-HOUSTON ELECTRIC COMPANY, OF CONNECTICUT.

ELECTRIC-LIGHTING SYSTEM AND APPARATUS.

SPECIFICATION forming part of Letters Patent No. 525,369, dated September 4, 1894.

Application filed February 21, 1887. Serial No. 228,276. (No model.)

*To all whom it may concern:*

Be it known that I, ELIHU THOMSON, a citizen of the United States, and a resident of Lynn, in the county of Essex and State of Massachusetts, have invented a certain new and useful Electric-Lighting System and Apparatus, of which the following is a specification.

My present invention consists of certain novel combinations of apparatus and improvements in details which are described in an application for patent filed by me May 21, 1884, patented March 29, 1887, No. 360,122, but which are not claimed therein, being reserved from said application to form the subject of a separate patent.

The object of my invention is to provide a system of electric lighting in which incandescent and arc lights may be operated from the same general circuit without the danger of interruption to the operation of the arc lights from the failure of incandescent lamps and without the employment of special cutouts or protective switches in connection with the incandescent lamps. It is frequently desirable in electric lighting where arc lamps are run in series on a high potential line of considerable length to operate incandescent lamps at one or more points on such circuit. This has heretofore been accomplished by including the incandescent lamp or lamps in the direct circuit with the arc lamps the arc light circuit being commonly split into a number of branches to accommodate a number of incandescent lamps of high resistance. In such a system it is necessary to combine with the incandescent lamp, proper automatic switches so that in case of rupture or failure in any of the incandescent lamps, the circuit for the arc lamps shall not be interrupted or seriously affected in its resistance. This system is liable to the two-fold objection that it requires the use of complicated and expensive switching appliances and that the switching appliances themselves may fail to act properly in which case the arc lights may go out or may be deranged.

My invention overcomes these objections by dispensing entirely with the use of switches for the incandescent lamps and by making a rupture of the arc circuit impossible from the rupture of the incandescent lamps.

To this end my invention consists generally speaking in an electric lighting system comprising arc and incandescent lamps, the arc lamps being included in series with one another on a main or principal circuit carrying a current of high electro-motive force proper for operating arc lamps in series, and incandescent lamps supplied with current inductively transferred from the main by the action of an induction coil whose primary is included in the main circuit while its secondary is connected to the circuit of the incandescent lamps.

My invention consists also in certain improvements in the details of construction of the induction coil and more particularly in the connections of coils, switches, &c., whereby the current of proper reduced electro-motive force and requisite quantity may be obtained for operating the incandescent lamps in multiple arc.

My invention consists further in the special combinations which will be specified more particularly in the claims.

In the accompanying drawings:—Figure 1, is a diagram illustrating the system. Fig. 2, represents diagrammatically an arrangement of circuits where a local circuit changer is employed with the induction coil for setting up changes of magnetic condition which shall produce the secondary or induced currents. Fig. 3, illustrates a modified disposition of the primary and secondary coils. Fig. 4, is an end view of the apparatus shown in Fig. 3. Figs. 5 and 6, are diagrams illustrating another portion of the invention. Fig. 7, illustrates another manner of combining the primary and secondary coils.

A, B, indicate a main line circuit carrying a current of proper electro-motive force for operating electric arc lamps of any suitable description indicated at $L^2$, which lamps are arranged upon the said circuit in the ordinary manner.

L, L, indicate the incandescent lamps which are supplied in multiple arc from the secondary coil or coils of an induction coil which is indicated at D, and which has its primary connected to the main line circuit. The variations or changes of current in the primary of said induction coil may be produced in any desired way but I prefer to employ a continuous current on the main line circuit A, B and to use circuit changers or commutators combined locally with the induction coil and adapted to operate in such way as not to interfere with the transmission of the current on the main line A, B, through the electric lights $L^2$. By means of the induction coil a current of the proper electro-motive force and quantity for operating the incandescent lamps in multiple is obtained and such quantity and electro motive force may be obviously entirely independent of the electro motive force and quantity of the current on the main circuit A, B, employed for operating the electric arc lamps.

C, D, indicate respectively the primary and secondary coil of the inductorium or induction coil which is provided with a movable core K, consisting of a bundle of iron wires constructed in any desired manner and adjustable within the coil either by hand or by automatic means as described in my application before referred to so as to regulate the electro-motive force of the secondary currents. One or more secondary coils as well as one or more primary coils may be used, as is obvious, upon the same core. A single primary and single commutator therefor may be employed if desired, but I prefer in general to use a primary divided into two or more sections and to change the current from one section to the other in succession.

In Figs. 1 and 2, I have illustrated a primary coil made in two divisions, and combined with a single commutator as will be presently described.

The secondary coil or coils which are made of wire of any gage suited to the needs of current and electro-motive force to be taken for running the incandescent lamps in multiple have their terminals connected to the wires 2, 2.

The two portions of the primary are indicated in Fig. 2, at 3, 5, where the main conductor A, is shown as branching through said coils in order to reach its continuation at B. As indicated, current entering at A, would pass oppositely in the two halves of the primary coil in order to reach the branches E, E', of a commutator to which the ends of said coils are respectively connected. The two portions 3, 5, may be superposed, interwound, or may occupy different longitudinal positions over the core.

In a bridge between the two terminals of the induction coils is a condenser F, of ample size to condense any extra current engendered in the primary coil. The commutator shown in this figure is a revolving commutator upon whose cylindrical surface the brushes E, E', bear, and consists in a conducting segment V, which is in constant connection with the main conductor B, and a segment W, which is insulated from the segment V. The brushes E, E', have sufficient bearing upon the cylinder so that the segment V, shall be always in contact with one or the other of them and a constant circuit shall be thus provided for the current upon the line A, B. Constant connection with the segment V, may be maintained by any suitable means, as for instance by the device well known in the art of a continuous ring mounted upon the same shaft with V, and electrically connected with it, and a brush bearing on the ring and connected with the wire B. The commutator may be revolved by any suitable device, as by clock work or by gearing connecting it with any source of power. I find, however, that a small electric motor driven by the electric current supplied through conductor A, B, is much to be preferred. Such an electric motor is indicated at M, with its coils in the circuit A, B, and operatively connected with the commutator by a belt. A switch S serves to shunt the motor M, to stop its action. When the switch is turned to the position shown in the drawings the current on the circuit A, B, flows through the motor, but when the switch is turned to make contact with the button $b^2$, the current passes around said motor bringing it to a stop.

Though not essential to the operation, I find it far preferable to run the commutator in such way that it may have a constant lubrication of mineral oil. It is here shown as running in a closed oil case in which is a quantity of oil indicated at O, sufficient in amount to permit the commutator to run just in contact with the oil surface.

By the revolution of the commutator driven at a high rate of speed by the electric motor mechanism M, connection is alternately made from brushes E, E', to conductor B, through the conducting segment V, without interruption of circuit. There results from this a passage of current at one instant of time from A, through primary coil section 3 to E, to source B, while at the next instant from A, through primary coil section 5, brush E', and to B, but as coils 3 and 5, are reversely wound so as to magnetize the core K, oppositely, there will be reversals of magnetism in K, corresponding in number with the number of changes of current in 3, and 5. These reversals develop current in the secondary D, which current finds circuit through the lamps L, or other apparatus. The condenser F, enhances the effects by absorbing and discharging the extra currents developed in the primaries at the instant of rupture of the segments V, with brushes E, E'.

The lubrication furnished by the body of oil O, gives great definiteness to the makes and breaks and secures a uniform discharge in the secondary. Copious lubrication is needed as mere ordinary oiling does not enhance the effects to any appreciable degree.

In Fig. 3, the coils 3, 5, are placed to either side of the secondary coil D. This arrangement conduces to effective insulation between them. It is desirable to suspend both sets of coils in free air so that they shall be separated from each other and from the core K, by a clear air space all round. This plan should be adopted where the main line current is of very high potential, say three thousand volts or over. The coils may be suspended in any desired manner suitable provision being made for insulation.

In Fig. 5, I have indicated a secondary coil divided into three sets or sections D, D', D², the terminals of which sections are connected to the plates $a$, $a'$, $b$, $b'$, $c$, $c'$, of an electric switch having plug or socket holes between the several plates adapted for the insertion of connecting metallic plugs. By connecting the plates as shown in Fig. 5, the secondary coils may be thrown into series to obtain increased tension, or by connecting them as shown in Fig. 6, they may be placed in multiple arc for quantity effect, or by other arrangements of the plug they may be placed in multiple arc and series so as to adapt the electro motive force to the demands of the apparatus supplied with secondary currents.

In Fig. 7, two secondary coils B, B', are indicated as in inductive relation to the two primaries 3, 5. The primaries may be wound on separate cores or the same core, and the secondaries may be employed separately or together for working local lines.

What I claim as my invention is—

1. The herein described system of electric lighting comprising electric arc lamps run in series on a line or circuit carrying current of high electro-motive force, and incandescent electric lamps supplied with current inductively transferred from the main by an induction coil whose primary is included in the main circuit while its secondary is connected to the circuit of the incandescent lamps.

2. The herein described system of electric distribution consisting of electric arc lamps in series, incandescent lamps in multiple arc, and an induction coil having its primary in the main line and its secondary connected to the line supplying the incandescent lamp branches.

3. In a system of electric distribution, a main or principal circuit having translating devices arranged in series upon it and supplied with current of proper electro-motive force for operating such devices in series, a transformer device properly constructed to convert the high tension current on the main circuit into a current of lower tension on the secondary circuit, and incandescent lamps or other translating devices connected in multiple arc to said secondary circuit.

4. In a system of distribution having a main or principal circuit operating translating devices in series therein, an induction coil having its primary connected to said circuit, means whereby the magnetic condition of the mechanism may be changed rapidly so as to be alternately of positive and negative conditions, a secondary coil or coils for the same, and incandescent lamps connected to said secondary in multiple.

5. In a system of combined electric arc and incandescent lighting, a main electric circuit having arc lamps arranged in series thereon and supplied with current of proper electro-motive force for varying such lamps in series, branches of such main circuit each containing the primary of an induction coil, a continuity preserving circuit changer for closing the circuit through the branches alternately, and incandescent lamps fed in multiple by secondary currents of less tension than those flowing through the arc lamps, as and for the purpose described.

6. In an inductorium, primary or secondary helices either or both of which are suitably mounted so as to be separated from one another and from the iron mass of the apparatus by a free air space.

Signed at Lynn, in the county of Essex and State of Massachusetts, this 18th day of February, A. D. 1887.

ELIHU THOMSON.

Witnesses:
E. WILBUR RICE, Jr.,
J. W. GIBBONEY.